United States Patent
Seshadri

(10) Patent No.: US 8,121,909 B2
(45) Date of Patent: Feb. 21, 2012

(54) ACTIVITY INFERENCE AND REACTIVE FEEDBACK

(76) Inventor: Vikram Seshadri, Chennai (IN)

( * ) Notice: Subject to any disclaimer, the term of this patent is extended or adjusted under 35 U.S.C. 154(b) by 425 days.

(21) Appl. No.: 12/035,459

(22) Filed: Feb. 22, 2008

(65) Prior Publication Data

US 2009/0138303 A1 May 28, 2009

(30) Foreign Application Priority Data

May 16, 2007 (IN) .......................... 1039/CHE/2007

(51) Int. Cl.
*G06Q 10/00* (2006.01)
(52) U.S. Cl. ....................................................... 705/28
(58) Field of Classification Search .................. 705/28
See application file for complete search history.

(56) References Cited

U.S. PATENT DOCUMENTS

| | | | | |
|---|---|---|---|---|
| 7,252,230 | B1 * | 8/2007 | Sheikh et al. ................. | 235/439 |
| 7,639,136 | B1 * | 12/2009 | Wass et al. ................. | 340/572.1 |
| 2003/0201321 | A1 * | 10/2003 | Maloney ....................... | 235/384 |
| 2005/0246248 | A1 * | 11/2005 | Vesuna ........................... | 705/28 |
| 2006/0055552 | A1 * | 3/2006 | Chung et al. ................ | 340/686.1 |
| 2006/0170565 | A1 * | 8/2006 | Husak et al. ............. | 340/825.49 |
| 2006/0180665 | A1 * | 8/2006 | Garber et al. ................. | 235/385 |
| 2006/0273903 | A1 * | 12/2006 | Kim et al. ................... | 340/572.1 |
| 2008/0035727 | A1 * | 2/2008 | Stanzel et al. ................ | 235/385 |
| 2008/0103944 | A1 * | 5/2008 | Hagemann et al. ............ | 705/28 |
| 2008/0218351 | A1 * | 9/2008 | Corrado et al. ............ | 340/572.4 |
| 2008/0284598 | A1 * | 11/2008 | Shah ......................... | 340/572.1 |
| 2010/0060455 | A1 * | 3/2010 | Frabasile .................. | 340/572.4 |

OTHER PUBLICATIONS

"Sen. Daniel K. Akaka Holds a Hearing on the DOD Supply Chain Management" Political Transcript Wire, Jul. 11, 2007.*

* cited by examiner

*Primary Examiner* — Matthew Gart
*Assistant Examiner* — Seye Iwarere
(74) *Attorney, Agent, or Firm* — Ash Tankha; Lipton, Weinberger & Husick

(57) ABSTRACT

Disclosed herein is a method of processing physical information collected from a plurality of sensors and deducing object attributes and actions over a facility. RFID tags are applied to determine position coordinates. A plurality of sensors related to activities or objects are applied for capturing a plurality of physical variables representing the activities or object attributes. Position coordinates and the plurality of physical variables are correlated to infer or deduce the activities that have occurred. Predetermined rules are applied to recommend one or more actions based on the deduced activities.

19 Claims, 5 Drawing Sheets

ACTIVITY INFERENCE AND REACTIVE FEEDBACK

BACKGROUND

This invention in general relates to automatic identification of a physical activity over a location, and specifically relates to a method and system for using information from independent sensor systems collaboratively in order to deduce or infer an accurate representation of a physical action or activity over a location, and to be able to use this information in order to provide appropriate reaction or feedback for management and control of the physical activity.

Radio Frequency Identification (RFID) is a set of technologies that uses the principle of electromagnetic signal transmission and communication, and allows uniquely identifiable elements (called tags) to be detected when the tags come within range of receivers (called readers). The tags may be attached to physical objects and the signal emitted from a RFID tag is used to identify the object associated with the tag. Currently, two different types of RFID systems exist: a passive RFID system that uses tags with an antenna and works on the principle of electromagnetic induction, and an active RFID system that uses a tag powered by an internal power source, for example, a battery.

Both technologies have unique capabilities and limitations that have thus far prevented their widespread adoption. Passive RFID tags work on the principle of electromagnetic induction. The simple construction of passive RFID tags allows these RFID tags to be produced very economically. However, the readers are necessarily much more complex in construction in order to broadcast signals strong enough to power the passive tags and yet sensitive enough to detect the weak return signal from the tag, therefore driving up the cost of passive readers. Also, since the signal strength for electromagnetic induction decays as the square of the distance between the tag and the reader, the read range is also very limited, for example to a maximum of few meters. Hence, passive RFID technology is currently suited only for tracking large quantities of items at very close ranges.

Active RFID tags are more complex, since active tags require an internal battery and an associated transmission circuitry, thereby making the active tags correspondingly much more expensive than a passive tag. However, an active reader is only a simple radio receiver and is fairly inexpensive to produce. As in the case of normal radio transmission, the range, even at extremely low power ranges normally used for active RFID transmission, is quite considerable, for example covering a few dozen meters or more. Hence, active RFID technology is ideal for tracking a limited number of items over a much larger area.

Additionally, current state of the art uses RFID technology as a means to detect the presence of a tagged object at a particular location or region. Using RFID technology in isolation seriously limits the amount of information available to a back-end information processing system—and reduces the usefulness of RFID technology. For instance, in the case of a security system, RFID sensors may detect the presence of authorized personnel at specified "control points" or locations, but the security system may be incapable of detecting unauthorized personnel who are not carrying RFID tags. So, relying on RFID sensor technology alone provides a very limited visibility of any physical activity or action.

Even when RFID technology works well, perhaps the significant limitation is that RFID provides only a limited view of any physical action or process. Any information system that uses inputs and produces an appropriate response requires a complete characterization of the physical process occurring within the system. For instance, a production planning system can perform effectively only when inputs such as production run quantities, stock and order levels, etc., are available to the production planning system. Therefore, the more complete the characterization of a physical process, the better is the quality of information processing and the corresponding deduced or inferred actions.

Any other physical characteristic, for example, weight, temperature, electric charge, pressure etc., may be sensed and used to form a more complete idea of the physical process. However, the challenge lies in integrating these different streams of information into a coherent characterization of the physical process that is occurring. And finally, along with sensing physical characteristics and forming an accurate representation of an actual physical process, there is a need for an appropriate feedback response for managing and controlling the physical process.

Thus, there is a need for a method and system that incorporates multi-sensor systems including RFID sensors and collates the information collected from the multi-sensor systems to provide a complete and accurate representation of an activity or object attribute, and provides a feedback response for managing and controlling the physical process.

SUMMARY OF THE INVENTION

The method and system disclosed herein incorporates multi-sensor systems and collates the information collected from the multi-sensor systems to provide a more complete and accurate representation of an activity or object attribute. Each sensor system may provide partial information about the activity or attribute. Implementing multi-sensor systems not only provides a more complete representation of the physical activity, but is also frequently more economical than relying on a larger number of a single type sensors.

Disclosed herein is a method of processing physical information collected from a plurality of sensors, including RFID sensors, and deducing object attributes and actions over a facility. RFID tags are used to determine position coordinates of activities and objects. A plurality of sensors related to activities or objects are applied for capturing physical variables representing the activities or object attributes. Position coordinates and the physical variables are correlated and are used to infer or deduce the activities that have occurred around an object. Predetermined rules are applied to recommend one or more actions based on the deduced activities in a facility.

A more complete picture of a physical process may be obtained by using different sensors, for example, the activity of an item that is removed from or put back on a shelf may be sensed by using a load cell to sense the items placed on the shelf. The method and system disclosed herein collects information from the multi-sensor systems. The collected information comprises object identification, object presence or absence, object weight, pressure, temperature, electric charge, activities around the objects or any other physical property that can be measured.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings; however, the invention is not limited to the specific methods and instrumentalities disclosed herein.

DETAILED DESCRIPTION OF THE INVENTION

Figure 1:
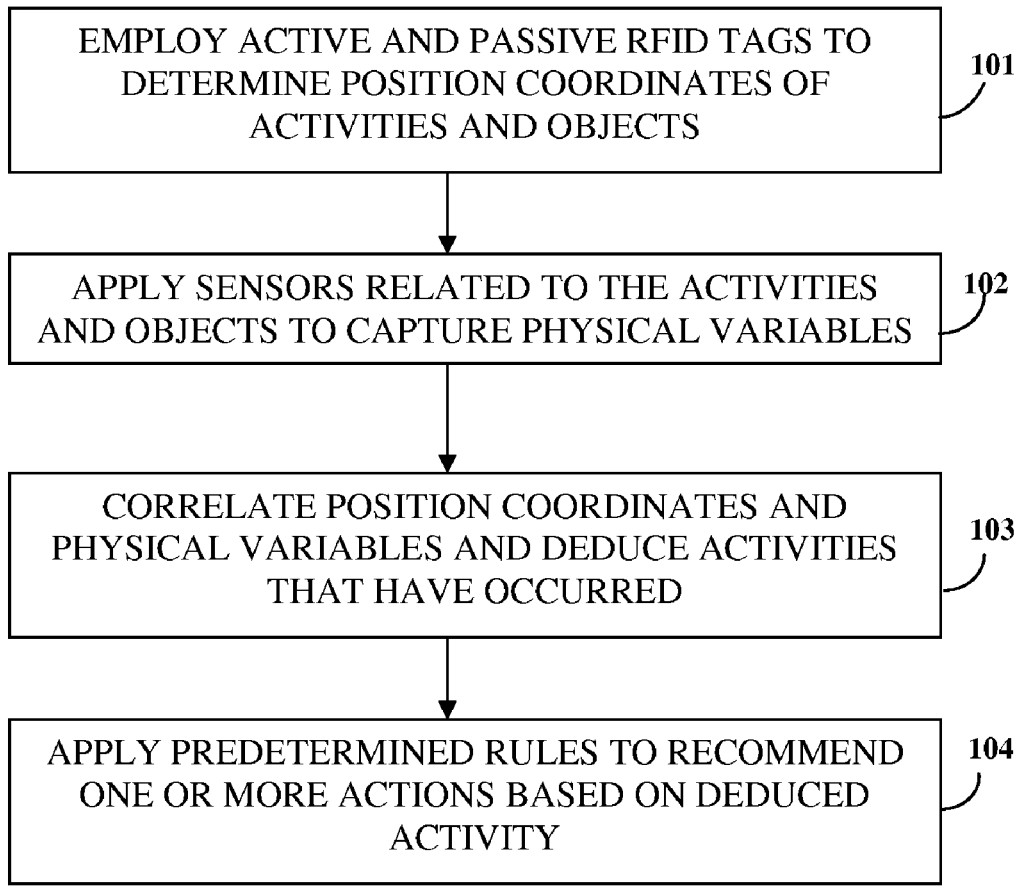
FIG. 1 illustrates a method of processing physical information and deducing an action over a facility.

FIG. 1 illustrates a method of processing physical information and deducing an action over a facility. Active RFID tags 304 or passive RFID tags 402 are employed 101 to determine position coordinates of activities and objects. A plurality of sensors is applied to the activities and objects 102 to capture physical variables. Position coordinates and the captured physical variables are correlated 103 and the correlated information is used to deduce object attributes and activities that have occurred. Predetermined rules are applied 104 to recommend one or more actions based on the deduced activities.

A coverage range of a sensor system is an identification zone. Active RFID tags 304 or passive RFID tags 402 may be used to determine position coordinates over all the identification zones located throughout the facility.

A plurality of sensors, applied on objects, may be used to capture the corresponding physical variables or attributes of the objects that comprise the physical process. The physical variables may include object attributes such as identity of an object, location of the identified object, quantity of the objects at a particular location, presence or lack of movement at the location, orientation of the objects, time at which the activity occurred, number of activities at a particular identification zone and environmental conditions of a particular identification zone. For example, in the case of access control, the system may include the identification of authorized personnel by an associated RFID tag. Identified authorized personnel are permitted access to any object within the identification zone.

Figure 2:
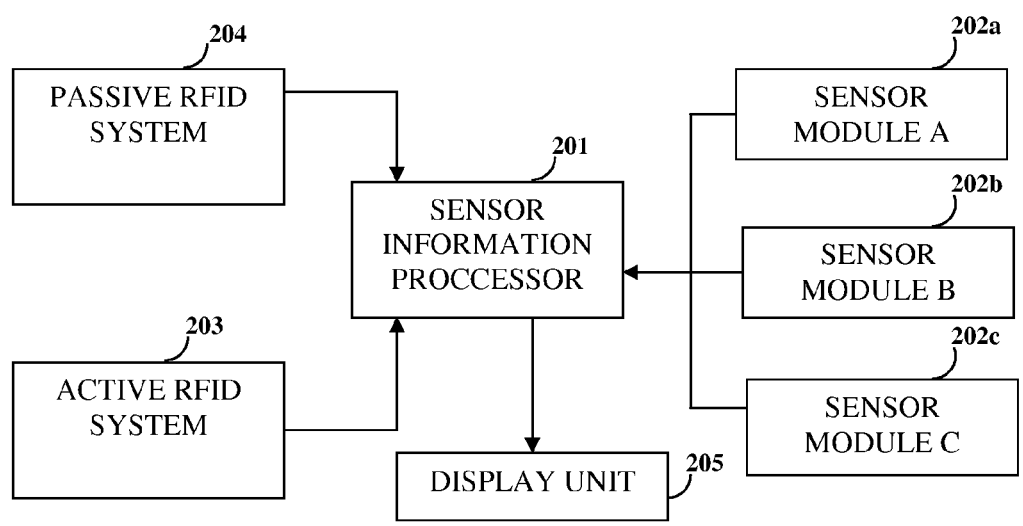
FIG. 2 illustrates a system for processing physical information and deducing an action over a facility.

A sensor information processor (SIP) 201 depicted in FIG. 2, receives independent but related information, such as physical variables and position coordinates of the object, and correlates this information to deduce an activity. A set of predetermined rules are applied to recommend one or more actions based on the deduced activity. The activities may include, but is not restricted to, loading and unloading of the object within the location, relocation of the objects, authorized movement of personnel, unauthorized movements and the location of such movements.

The recommended actions may include, but are not restricted to access control, recording time of the activity, updating object inventory, determining discrepancies in the physical object inventory, triggering an alarm, sending messages as formatted text to another computer or communication device, or even physical activities like switching a machine or device on or off, etc. In the example of an access control application, any unauthorized personnel's entry into a secure zone, or the movement of an identified object without the presence of a corresponding authorized personnel in the vicinity may be used to trigger an alarm action. Alarms may be triggered to indicate anomalous actions or activities like discrepancies in object inventories, and unauthorized movements within the identification zones.

FIG. 2 illustrates a system for processing physical information and deducing an action at a facility comprising a passive 204 and/or an active 203 RFID system, sensor modules, a sensor information processor 201 and a display unit 205. The combination of passive 204 and/or active 203 RFID systems and a plurality of sensor modules is hereafter referred as multi-sensor system. A passive RFID system 204 based on the principle of electromagnetic induction may be used to determine information about the identity of the object at the particular location. Each object associated with a passive RFID tag 402 may be scanned at any location to decode the identity of an object. In another embodiment of the system disclosed herein, a barcode or any identification technology not based on RFID may also be used to identify the object—and the barcode may be scanned at any location to decode the identity of the object. An active RFID system 203 may be used to determine the location of the identified object. Independent information about the location where the scan occurred may be received from the active RFID system 203 through the read of the active RFID tag attached to the scanner. The multi-sensor system further collects information on the physical attributes of objects, activities around the objects or any other physical property that can be measured. The plurality of sensor modules comprises sensor module A 202a, sensor module B 202b, sensor module C 202c, etc. Each sensor module may comprise one or more motion sensors or detectors, barcode readers, optical sensors, video cameras, radiation monitors, electronic weighing machines, temperature sensors, electrical resistance sensors, chemical sensors, sound sensors, etc. A sensor information processor 201 electronically collates correlated information such as physical variables and position coordinates from all the sensors, to provide an accurate representation of the physical location or activity.

Figure 3:
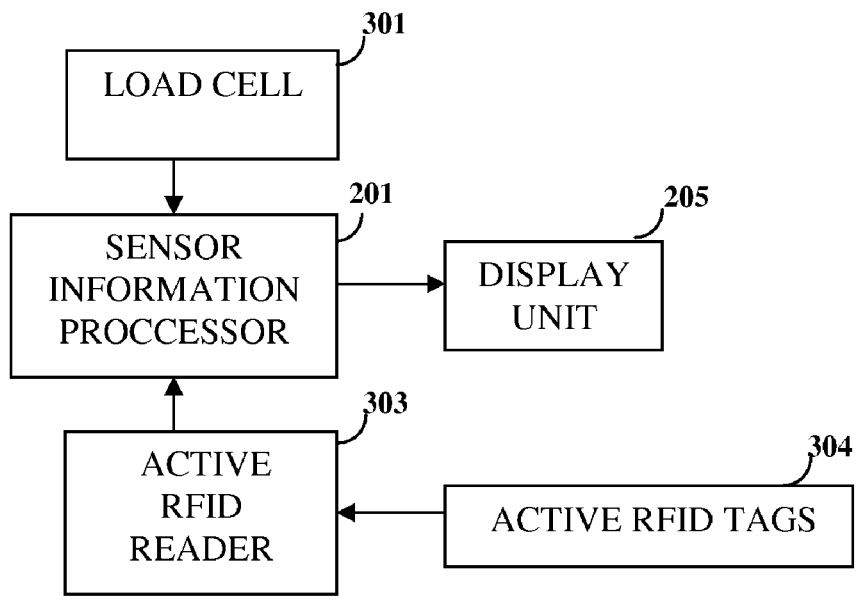
FIG. 3 illustrates an example of utilization of independent but related signal information through correlation from a plurality of sensors in a retail establishment.

FIG. 3 illustrates an example of the utilization of independent but related signal information from a plurality of sensors in an inventory establishment. An inventory may be a list of goods or materials available in the stock in an inventory cabinet having multiple shelves. A shelf is embedded with load cells 301 and may be used to store objects of a particular type. The sensor modules in this inventory establishment are essential to determine the exact count of objects on a shelf, or within an inventory cabinet. As described previously, an active RFID reader 303 may be used to determine the location and identity of the individual performing the inventory activity, and object properties such as weight may be used to determine the count of objects on the shelves. Independent information about the number or quantity of objects upon a particular shelf may be provided by load cells 301 that measure the total weight of objects upon that shelf. The use of load cells 301 to collect information about the number of objects on a shelf eliminates the necessity of each object to be individually associated with a tag, RFID or barcode, thus providing a cost effective solution.

A load cell 301 is an electronic sensor that measures the weight of an object. The load cells 301 are embedded in shelves in the inventory cabinet to determine the weight applied on these shelves. If the weight of one of the objects is predetermined, the total weight on a particular shelf accounts for the number of similar objects on that shelf. Consider an example of an inventory cabinet comprising shelves stacked with a number of similar objects. If an additional number of objects are stacked on these shelves, the sensor information processor 201 receives the information from the load cells 301 embedded on the shelves. The sensor information processor 201 compares the information of the present inventory with the previous inventory. If a change between the present inventory and the previous inventory is identified, the sensor information processor 201 deduces the change in the number of objects on the shelves and consequently updates the inventory. The inventory information may be displayed on a display unit 205.

In addition, an active RFID system 203 may be used to identify the individual responsible for effecting the inventory transactions in the inventory cabinets. Each authorized individual may be identified by means of an active RFID tag 304 attached to the individual. In one embodiment, the inventory shelf may be locked, and the identity of the individual and the individual's associated access privileges may be used to determine whether the inventory shelf should be automatically unlocked in order to allow access to the contents of the inventory shelf.

The sensor information processor 201 receives independent but related information such as the weight on each shelf of the inventory cabinet and information of an inventory transaction, as well as identity of each individual authorized to effect inventory changes or transactions within the inventory establishment. An inventory transaction may be a removal of an object from the shelf, addition of an object on the shelf, relocation of an object, etc. The load cells 301 determine the quantity of objects involved in a transaction. The location and identity of the individual effecting an inventory transaction on a shelf may be determined from the active RFID tag 304 associated with the individual, by identifying the individual who is proximal to the shelf where the inventory transaction is effected. The sensor information processor 201 collects the information from the load cells 301 and the active RFID system 203. The sensor information processor 201 collates the independent streams of information from the load cells 301 and the active RFID system 203 by matching the individual, proximal to the shelf in both space as well as time. When the inventory change occurs, the sensor information processor 201 conclusively identifies the individual responsible for the inventory change. The inventory transaction, complete with details of the objects added or removed from the shelves, as well as the individual responsible for adding or removing objects, may then be recorded within an information system entrusted with tracking all inventory changes in the system for purposes of accountability, billing etc.

In the above inventory transaction, independent but related information from two or more types of sensors, i.e., load cell 301 and RFID sensors, is used to determine a more accurate representation of physical activities, for example the removal of an item from a shelf by an individual, as compared to the use of a single type of sensor. The activities concerning the objects are deduced from the independent but related information obtained from multiple sensors. Based on the deduced activities, a set of predetermined rules are applied to recommend one or more actions. For example, an activity deduced may be a removal or an addition of an object to a shelf by an authorized individual. The addition or removal of objects may be deduced by determining a differential output from the load cells 301 embedded in the shelves, collated with information from the active RFID systems 203. Once this activity is deduced, a predetermined rule may be executed, for example, one may specify that if a change between the recorded inventory and the physical inventory is identified, then the recommended action will be an update of the inventory record, the identification of the individual responsible for the inventory change, or a replenishment of the item on the shelf if the inventory count falls below a particular level.

Figure 4:
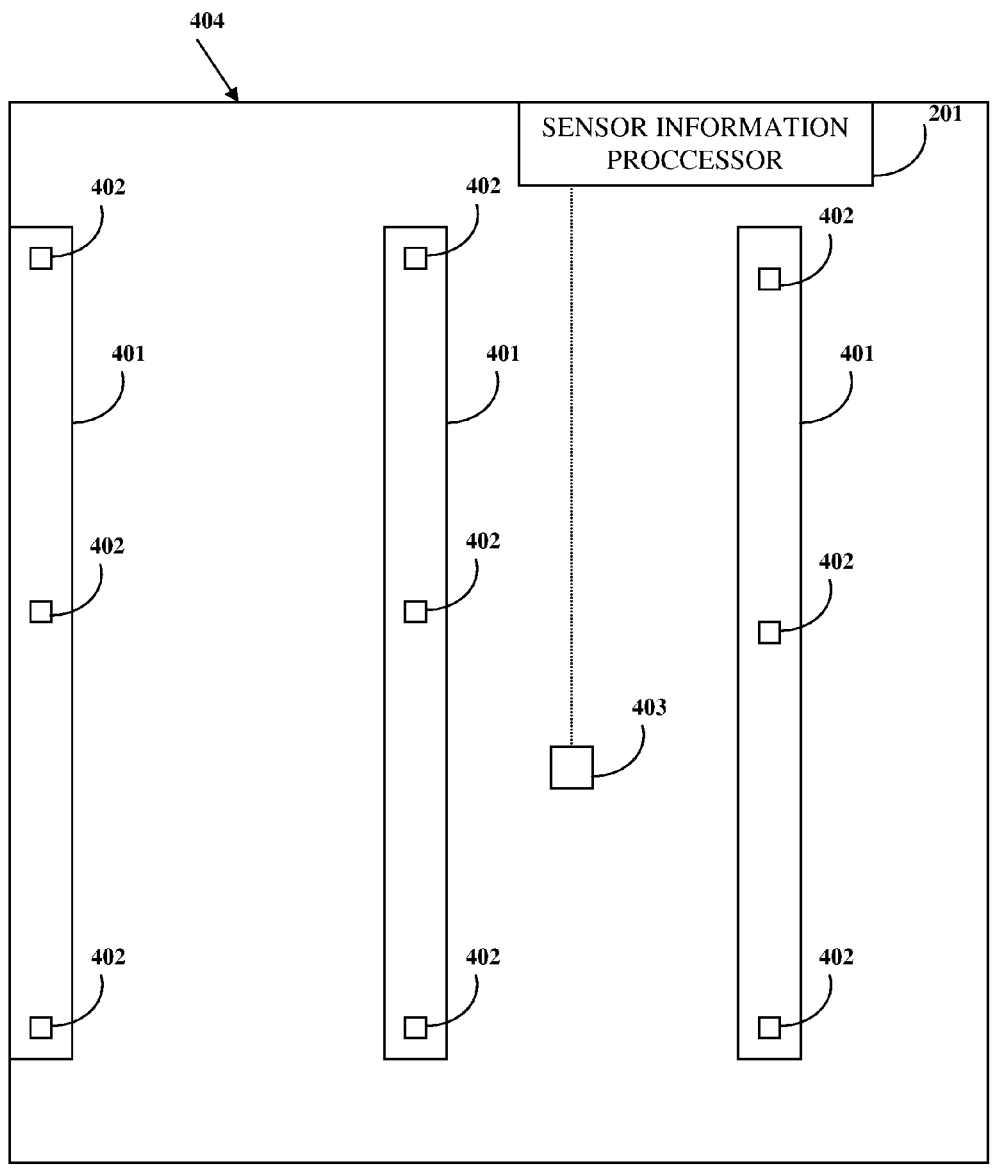
FIG. 4 illustrates an example of utilization of independent but related signal information from a plurality of sensors in a warehouse facility.

FIG. 4 illustrates an example of the utilization of independent but related signal information from a plurality of sensors in a warehouse facility 404 to deduce a physical activity. Active RFID tags 304 may be attached to and used to locate each material handling equipment within the warehouse facility 404. Passive RFID tags 402 or even barcodes may be attached to each warehouse object in order to uniquely identify the object. Each object may be scanned either manually or automatically at its respective location during an activity. Examples of activities include receiving objects, placing objects at any location within the warehouse facility 404, or removing objects.

Active RFID tags 304 may be attached to either a mobile reader 403 or an authorized material handling personnel. The mobile reader 403 may be a passive RFID scanner or barcode reader. The mobile readers 403 may be further attached to any material handling equipment used to move material within the warehouse facility 404. Information about the location of a barcode or RFID scan is obtained from the active RFID system 203, through the read of the active RFID tag 304 attached to the scanner or material handling equipment. The active RFID system 203 identifies the location or "zone" of any mobile reader 403 within the warehouse facility 404, and by inference, the location or "zone" of the scanned RFID tag is determined. When the mobile reader 403 approaches a warehouse object associated with a passive RFID tag 402, the passive RFID tag 402 is energized by the induced electromagnetic field of the mobile reader 403. The energized passive RFID tag 402 begins to emit signals that are read by the mobile reader 403. Independently, the read of the active RFID tag 304 attached to the scanner may be used to determine the location of the mobile reader 403, and hence to determine the location of the passive tag scan within the warehouse facility 404. Therefore a multi-sensor hybrid system not only provides a low cost means for identifying objects using passive tags or barcodes, but also identifies object locations using independent but related information derived from the active tags.

Consider the example of a warehouse facility 404, where the passive RFID tags 402 are attached to objects placed on the shelves 401. The active RFID tags 304 are attached to trucks involved in warehouse activities. If an object is relocated from one shelf 401 to another shelf 401, then the activity detection process involves scanning the object at the first shelf before the object is moved, and then again at the second shelf after object is moved to the second shelf. The sensor information processor 201 collates the position information from the active RFID tags 304 and the objects identified by passive RFID tags 402, to infer that the items have been relocated from the first to the second shelf. The sensor information processor 201 compares the identity and location of the mobile scanner or reader 403, or material handling equipment located proximally both in space and time to the first shelf when the first scan event happens, and then to the second shelf when the second scan event happens, thereby deducing the "relocation" event for the associated objects.

These relocation events may then be recorded in the sensor information processor 201, with details of both the objects involved in the relocation activity, as well as the individual identified by the scanner or material handling equipment responsible for the event, in order to provide traceability and accountability of both materials and personnel.

Figure 5:
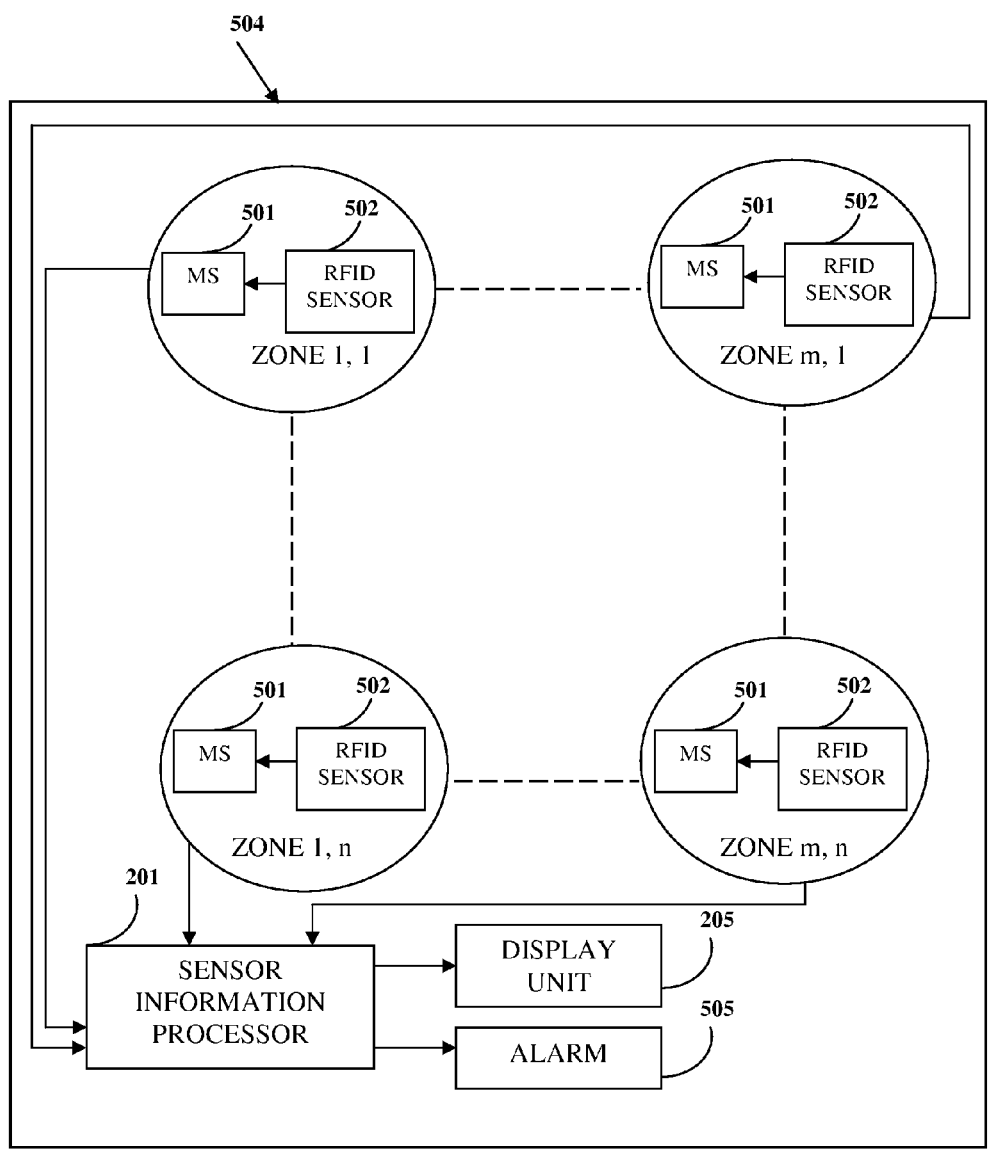
FIG. 5 illustrates an example of the utilization of independent but related signal information from a plurality of sensors in a high security area.

FIG. 5 illustrates an example of the utilization of independent but related signal information from a plurality of sensors in a high security area 504. The sensor system in a high security area 504 may comprise motion detection equipment and active RFID sensors 502. Motion detection equipment may comprise motion sensors (MS) 501 such as a radar gun, an occupancy sensor, heat sensor, motion detector, etc., to detect any movement or physical activity. Active RFID tags 304 are provided to each personnel, which may be used as a standard mechanism for personnel authentication.

Motion detection or heat sensing equipment and the active RFID sensor 502 together generate an identification zone. A sensor information processor 201 receives information from the motion detection equipment and the active RFID sensors 502. Information from the active RFID sensors 502 will contain the identity of the personnel within the vicinity of the motion sensors 501. These two individual information streams, i.e., from one of the motion sensors 501 as well as the active RFID system 203, may be collated by determining which individual is located proximally in both space and time to the motion sensor that has detected a movement in its vicinity. A movement is an identified movement if a trigger of one of the motion sensors 501 has a corresponding read from one of the active RFID tags 304. The activities in a high security area 504 may comprise authorized movements, unauthorized movements, unidentified movements, a "double entry" signifying movements of two individuals with only one corresponding read of an active RFID tag, etc.

A set of predetermined rules may be applied to recommend one or more actions based on the deduced activities. Consider an example where a deduced activity is an unauthorized movement that results from a trigger of one of the motion sensors 501 without a read from the corresponding active RFID sensor 502 in the vicinity of the triggered motion sensor. A predetermined rule may specify that an unidentified movement is a cause for alarm. Thus, the recommended action may be signaling a siren or a remote alarm 505 at a monitoring station, with a display unit 205.

It will be readily apparent that the various methods and algorithms described herein may be implemented in a computer readable medium, e.g., appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, Sun® processors, IBM® processors etc., that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of processing physical information and deducing an action, comprising the steps of:
   employing one or more of active radio frequency identification tags and passive radio frequency identification tags to determine one or more of position coordinates and unique identity of activities and objects over a facility, wherein one or more of said position coordinates and said unique identity constitute first partial information streams regarding said activities and attributes of said objects transmitted to a sensor information processor;
   applying a plurality of sensors applied to said activities and objects for capturing a plurality of physical variables, wherein one or more of said physical variables constitute second partial information streams regarding the activities and said attributes of the objects transmitted to said sensor information processor;

correlating one or more of said first partial information streams with one or more of said second partial information streams by said sensor information processor to deduce one or more actual physical activities that have occurred; and applying predetermined rules by said sensor information processor to recommend one or more actions relevant to the facility based on said deduced activities.

2. The method of claim 1, wherein said position coordinates are based on a plurality of identification zones located in a facility.

3. The method of claim 2, wherein said identification zones comprise a plurality of coverage ranges of one of said passive and active radio frequency identification tags.

4. The method of claim 1, wherein said plurality of physical variables may be identification of an object, location of said identified object, quantity of said objects at a particular location, presence or lack of movement at said location, orientation of the objects, time at which said activity occurred, number of activities at a particular identification zone, environmental conditions of each of the identification zones.

5. The method of claim 1, wherein said deduced activity comprises loading and unloading of said object within said location, relocation of the objects, authorized movements of personnel, and unauthorized movements and location of said movements.

6. The method of claim 1, wherein said recommended actions comprise access control, recording time of said activity, updating object inventory, determining discrepancies in physical object inventory, alarming said discrepancy, and alarming unauthorized movements within an identification zone.

7. The method of claim 4, wherein determination of said quantity of objects at a particular location comprises the steps of determining load at each location, and identifying changes in said load and thereby deducing one of said activity.

8. The method of claim 4, wherein determination of said location of an object comprise the step of scanning passive radio frequency identification tags or barcodes associated with said object, wherein said step of scanning is performed using a mobile radio frequency identification or barcode reader, thereby deducing one of said activity.

9. The method of claim 4, wherein determination of said presence or lack of movement of said object comprises the step of identifying said movement using a motion sensor.

10. The method of claim 9, wherein said movement is an authorized movement if a trigger of said motion sensor has a corresponding read from an active radio frequency identification tag.

11. A system for processing physical information and deducing an action, over a facility comprising:
a radio frequency identification system to determine one or more of position coordinates and unique identity of objects and activities, wherein one or more of said position coordinates and said unique identity constitute first partial information streams regarding said activities and attributes of said objects;
a plurality of sensor modules for capturing physical variables applied to said objects and physical activities, wherein one or more of said captured physical variables constitute second partial information streams regarding the activities and said attributes of the objects;
a sensor information processor for correlating one or more of said first partial information streams with one or more of said second partial information streams to deduce one or more actual physical activities that have occurred; and
said sensor information processor for applying predetermined rules to recommend one or more actions relevant to the facility based on said deduced activities.

12. The system of claim 11, wherein said sensor modules comprise electronic weighing machines, load cells, active radio frequency identification system, passive radio frequency identification system, barcodes, motion detection equipments, optical sensors, video cameras, radiation monitors, etc.

13. The system of claim 11, wherein each of said sensor modules may provide a partial representation of said physical variables.

14. The system of claim 11, wherein information derived from said sensor modules may be collated electronically to provide a complete representation of an actual physical activity.

15. The system of claim 12, wherein said load cells determine the quantity or amount of the object at a location.

16. The system of claim 11, wherein said passive radio frequency identification system and barcode scan uniquely identify each of said objects.

17. The system of claim 12, wherein said active and passive radio frequency identification systems determine the location of said objects.

18. The system of claim 12, wherein said motion detection equipment determines the presence or lack of any movement or activity of said object at said position coordinates.

19. A computer program product comprising computer executable instructions embodied in a computer-readable medium, said computer program product comprising:
a first computer parsable program code for applying active and passive radio frequency identification tagging to determine one or more of position coordinates and unique identity of activities and objects over a facility, wherein said position coordinates and said unique identity constitute first partial information streams regarding said activities and attributes of said objects;
a second computer parsable program code for applying a plurality of sensors applied to activities or objects for capturing a plurality of physical variables, wherein one or more of said physical variables constitute second partial information streams regarding the activities and said attributes of the objects;
a third computer parsable program code for correlating one or more of said first partial information streams with one or more of said second partial information streams to deduce one or more actual physical activities that have occurred; and
a fourth computer parsable program code for applying predetermined rules to recommend one or more actions relevant to the facility based on said deduced activities.

* * * * *